United States Patent
Pike et al.

(10) Patent No.: US 11,400,797 B2
(45) Date of Patent: Aug. 2, 2022

(54) PREVENTION OF EXHAUST GAS INTRUSION IN A VEHICLE

(71) Applicant: Nissan North America, Inc., Franklin, TN (US)

(72) Inventors: Craig Pike, Chandler, AZ (US); Ryan Vanwormer, Phoenix, AZ (US); Yosmany Lopez, Walled Lake, MI (US); Norm Bradley, Maricopa, AZ (US); Damon Carlisle, Maricopa, AZ (US); Gerald McClellan, Maricopa, AZ (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 239 days.

(21) Appl. No.: 16/147,038

(22) Filed: Sep. 28, 2018

(65) Prior Publication Data

US 2020/0101821 A1   Apr. 2, 2020

(51) Int. Cl.
| | | |
|---|---|---|
| *B60H 3/00* | (2006.01) | |
| *B60H 1/00* | (2006.01) | |
| *B60W 10/30* | (2006.01) | |
| *B60N 2/02* | (2006.01) | |

(52) U.S. Cl.
CPC .......... *B60H 3/0085* (2013.01); *B60H 1/008* (2013.01); *B60H 1/00849* (2013.01); *B60N 2002/0272* (2013.01); *B60W 10/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,027,609 | A * | 7/1991 | Yashiki | F02D 29/04 62/133 |
| 5,802,861 | A * | 9/1998 | Yamashita | B60H 1/3208 62/133 |
| 8,649,941 | B1 | 2/2014 | Tsuda et al. | |
| 2003/0102688 | A1* | 6/2003 | Bingle | E05B 83/26 296/76 |
| 2010/0236770 | A1* | 9/2010 | Pursifull | B60H 1/00764 165/202 |
| 2013/0131933 | A1* | 5/2013 | Seo | B60H 1/00849 701/49 |
| 2013/0267157 | A1* | 10/2013 | Park | B60H 1/00821 454/70 |
| 2016/0137029 | A1 | 5/2016 | Saito | |
| 2017/0361678 | A1 | 12/2017 | Wagner et al. | |
| 2018/0297444 | A1* | 10/2018 | Jung | B60H 1/00835 |

* cited by examiner

*Primary Examiner* — Steven B McAllister
*Assistant Examiner* — Elizabeth M. May
(74) *Attorney, Agent, or Firm* — Global IP Counselors, LLP

(57) ABSTRACT

A method of preventing exhaust gas intrusion in a passenger compartment of a vehicle is provided. Whether a vehicle operating condition resulting in an increased carbon monoxide emission at an exhaust pipe is present is detected. Whether a vehicle component condition is present is detected. The vehicle component condition is an open window or an open sunroof. An HVAC setting is switched from a recirculating air mode to a fresh air mode when at least one of the vehicle operating condition and the vehicle component condition is detected as being present.

2 Claims, 10 Drawing Sheets

PREVENTION OF EXHAUST GAS INTRUSION IN A VEHICLE

BACKGROUND

Field of the Invention

The present invention generally relates to a system of preventing exhaust gas from entering a passenger compartment of a vehicle. More specifically, the present invention relates to a system that switches a vehicle HVAC system from a recirculating air mode to a fresh air mode.

Background Information

Carbon monoxide can enter a passenger compartment of a vehicle under certain conditions. The presence of one of these conditions, such as a negative pressure in a passenger compartment of the vehicle or high carbon monoxide emissions in the vehicle exhaust, can increase the possibility of carbon monoxide intrusion into the passenger compartment. When carbon monoxide has entered the passenger compartment, operation of the HVAC system in a recirculating air mode maintains the level of carbon monoxide in the passenger compartment by recirculating the passenger compartment air containing carbon monoxide and not introducing fresh air. Accordingly, a need exists for the prevention of exhaust gas intrusion in a vehicle.

SUMMARY

One aspect of the present invention is to provide a method of preventing exhaust gas intrusion in a passenger compartment of a vehicle. Whether a vehicle operating condition resulting in an increased carbon monoxide emission at an exhaust pipe is present is detected. Whether a vehicle component condition is present is detected. The vehicle component condition is an open window or an open sunroof. An HVAC setting is switched from a recirculating air mode to a fresh air mode when at least one of the vehicle operating condition and the vehicle component condition is detected as being present.

Another aspect of the present invention is to provide a method of preventing exhaust gas intrusion in a passenger compartment of a vehicle. Whether a vehicle malfunction indicator light is illuminated is detected. Whether a vehicle component condition is present is detected. The vehicle component condition includes an open window or an open sunroof. An HVAC setting is switched from a recirculating air mode to a fresh air mode when at least one of the malfunction indicator light being illuminated and the vehicle component condition is detected as being present.

Another aspect of the present invention is to provide a vehicle HVAC mode setting assembly including an HVAC system having a recirculating air mode and a fresh air mode. An electronic control module is configured to detect an operating mode of the HVAC system. A plurality of sensors are electronically connected to the electronic control module and are configured to detect operating parameters of the vehicle. A controller is electronically connected to the electronic control module and configured to switch the operating mode of the HVAC system between the recirculating air mode and the fresh air mode. The electronic control module is configured to send a signal to the controller to switch the operating mode of the HVAC system from the recirculating air mode to the fresh air mode when a predetermined operating parameter is detected by one of the plurality of sensors.

Also other objects, features, aspects and advantages of the disclosed method and apparatus for preventing exhaust gas intrusion in a passenger compartment of a vehicle will become apparent to those skilled in the art from the following detailed description, which, taken in conjunction with the annexed drawings, discloses exemplary embodiments of the vehicle body structure.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
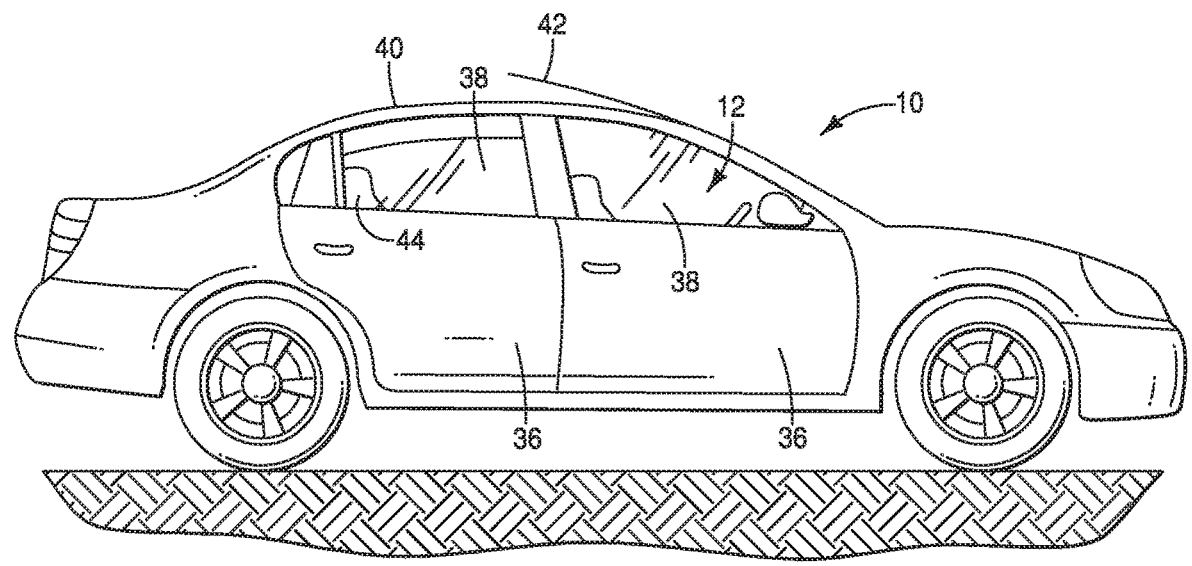
FIG. 1 is a schematic view of a vehicle including exhaust gas intrusion prevention system in accordance with an exemplary embodiment of the present invention.
Figure 2:
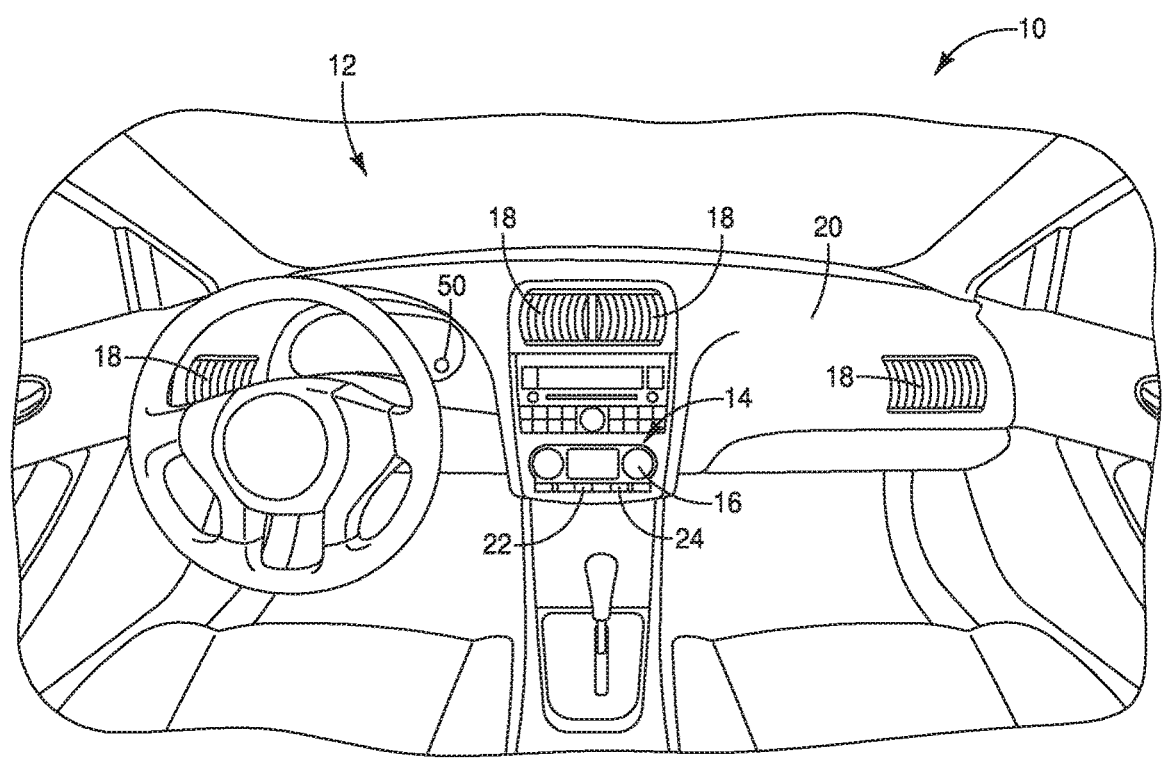
FIG. 2 is a side elevational view of the vehicle of FIG. 1.
Figure 3:
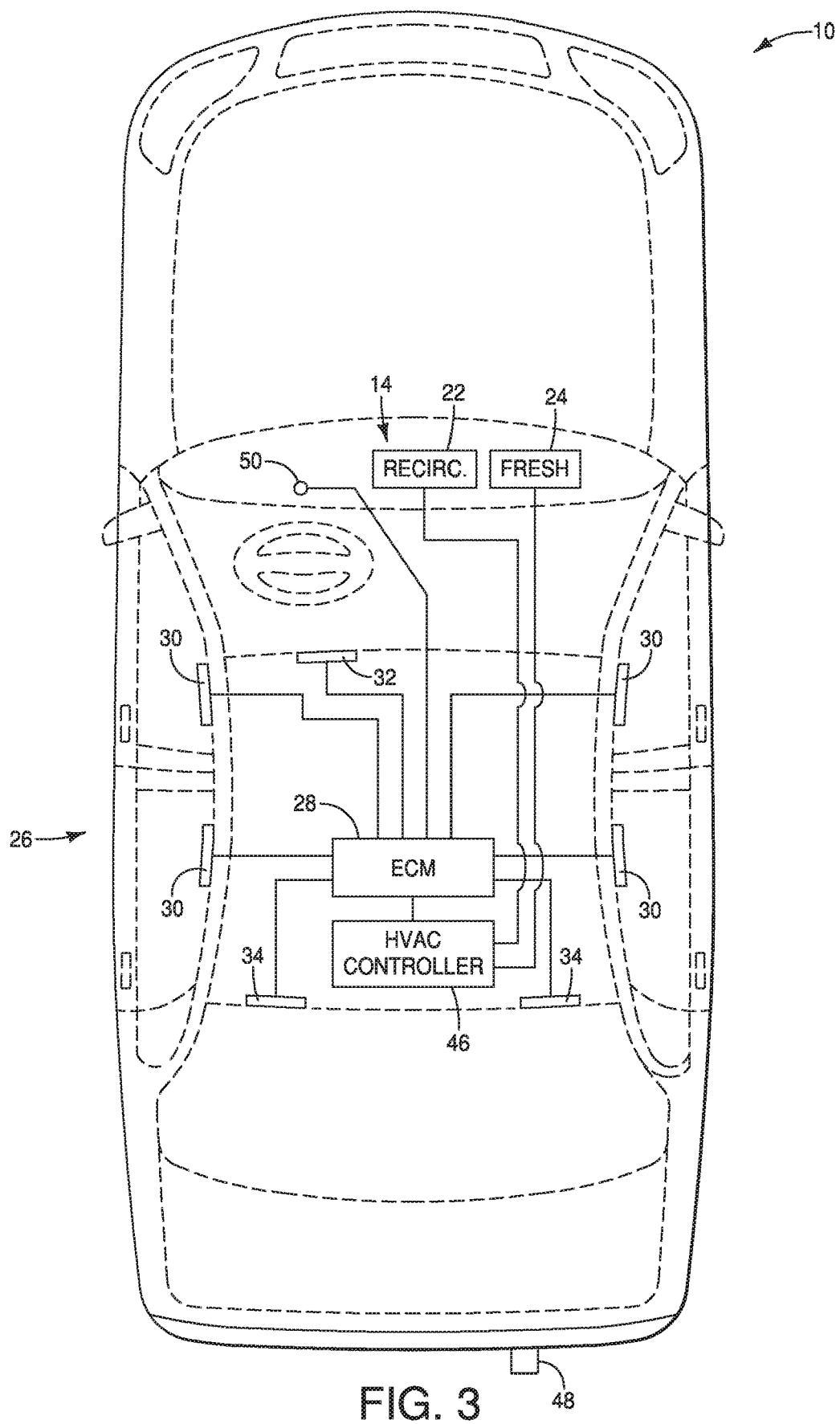
FIG. 3 is a perspective view of a passenger compartment of the vehicle of FIG. 1.

Referring initially to FIGS. 1-3, a vehicle 10 is illustrated in accordance with an exemplary embodiment of the present invention. The vehicle 10 can be any of a variety of vehicles. In FIG. 1, the vehicle 10 is depicted as a four door sedan. However, the vehicle 10 can alternatively be an SUV (sport utility vehicle), a CUV (crossover utility vehicle), a truck, a compact vehicle, a coupe or a large commercial vehicle. The vehicle 10 can be any vehicle capable of generating carbon monoxide.

As shown in FIGS. 1-3, the vehicle 10 defines a passenger compartment 12 and includes an HVAC system (heating, ventilation and air conditioning) 14 that has a control panel 16 and a plurality of vent assemblies 18 that are installed at various locations along an instrument panel 20. Each of the vent assemblies 18 is configured to direct air from the HVAC system 14 into the passenger compartment 12.

The HVAC system 14 includes a compressor (not shown), an evaporator (not shown), a condenser (not shown) and an air handling assembly (not shown) that directs air to the vent assemblies 18. The air handling assembly also includes a heater core (not shown) and a blower (not shown). The HVAC system 14 is configured to provide cooled air or heated air through the vent assemblies 18, depending upon the desire and selections made by a vehicle occupant while the vehicle 10 is being operated. HVAC systems 14, compressors, evaporators, condensers, air handling assemblies and heater cores are conventional elements of a vehicle, such that further description thereof is omitted for the sake of brevity.

The HVAC system 14 includes a recirculating air mode and a fresh air mode. The control panel 16 of the HVAC includes a recirculation button 22 and a fresh air button 24, as shown in FIG. 3. Pressing the recirculation button 22 causes the HVAC system to operate in a recirculating air mode. The HVAC system recirculates the air in the passenger compartment when operating in the recirculating air mode. Pressing the fresh air button 24 causes the HVAC system to operate in a fresh air mode. The HVAC system draws outside air into the vehicle when operating in the fresh air mode. The HVAC system is configured to operate in either the recirculating air mode or in the fresh air mode. Pressing one of the recirculation button 22 or the fresh air button 24 when the vehicle is currently operating in the other mode causes the HVAC system to switch from the previous mode to the selected mode. Pressing the recirculating button 22 when the HVAC system is operating in the fresh air mode will switch the HVAC system to operation in the recirculating air mode. Pressing the fresh air button 24 when the HVAC system is operating in the recirculating air mode will switch the HVAC system to operation in the fresh air mode. Alternatively, a single button can be used that is pressed to operate the HVAC system in the recirculating air mode, and pressed again to switch to the fresh air mode.

A vehicle HVAC mode setting assembly 26 in accordance with an exemplary embodiment of the present invention includes the HVAC system 14 and an electronic control module 28 configured to detect an operating mode of the HVAC system 14. The electronic control module 28 is configured to detect an operating mode of the HVAC system 14.

The HVAC mode setting assembly 26 further includes a plurality of sensors in communication with the electronic control module 12. The plurality of sensors are configured to detect operating parameters of the vehicle 10. The plurality of sensors include a window sensor 30 and a sunroof sensor 32. The plurality of sensors can further include a rear seat sensor 34.

A window sensor 30 is disposed in a passenger door 36 of the vehicle 10 to detect whether a window 38 is in an open position, as shown in FIGS. 1 and 3. Preferably, a window sensor 30 is disposed proximate each window 38, such as in each passenger door 36, to detect whether the window 38 is in an open position. The window sensor 30 can be any suitable sensor, such as a proximity sensor or a mechanical sensor. Each window sensor 30 is electronically connected to the electronic control module 28 to communicate a signal indicating the detected position of the window 38.

A sunroof sensor 32 is disposed proximate a sunroof 42, such as in a roof 40 of the vehicle 10, to detect whether the sunroof 42 is in an open position, as shown in FIGS. 1 and 3. The sunroof sensor 32 is configured to detect whether the sunroof 42 is in an open position, such as an angled position as shown in FIG. 1 or retracted from a fully closed position. The sunroof sensor 32 can be any suitable sensor, such as a proximity sensor or a mechanical sensor. The sunroof sensor 32 is electronically connected to the electronic control module 28 to communicate a signal indicating the detected position of the sunroof 42.

The rear seat sensor 34 is disposed proximate a rear seat 44 of the vehicle to detect whether the rear seat 44 is in an upright position, as shown in FIGS. 1 and 3. Preferably, a rear seat sensor 34 is disposed proximate each rear seat 44 capable of being moved from the upright position, i.e., folded toward a front seat of the vehicle 10. Typically, rear seat sensors 34 are used in sedans, and not used in sport or crossover utility vehicles (SUV/CUV). When a rear seat 44 is folded down in a sedan, a leakage path can be created from the trunk into the passenger compartment 12, which was previously sealed by the rear seat 44 being in an upright position. In an SUV/CUV, the passenger compartment is typically open to the cargo area with any position of the rear seat.

The vehicle HVAC mode setting assembly 26 further includes an HVAC controller 46 electronically connected to the electronic control module 28. The controller 46 is configured to switch the operating mode of the HVAC system 14 between the recirculating air mode and the fresh air mode. As described in further detail below, the electronic control module 28 is configured to send a signal to the controller 46 to switch the operating mode of the HVAC system 14 from the recirculating air mode to the fresh air mode when a predetermined operating parameter is detected by one of the plurality of sensors.

The electronic control module 28 is electronically connected to each of the plurality of sensors such that a signal indicating the parameter detected by the sensor can be transmitted to the electronic control module 28. The electronic control module 28 is electronically connected to the controller 46 such that the electronic control module 28 can send a signal to the controller 46. The controller 46 is configured to switch the operating mode of the HVAC system 14 from the recirculating mode to the fresh air mode when a predetermined operating parameter is detected by one of the plurality of sensors. The controller 46 can be further configured to prevent the operating mode from being switched back to the recirculating air mode from the fresh air mode until a vehicle engine (not shown) is shut off after receiving the signal from the controller 46. Such further switching can be prevented by locking the operation mode of the HVAC system 14 in the fresh air mode until the vehicle is turned off.

In accordance with an exemplary embodiment of the present invention, a method of preventing exhaust gas intrusion includes detecting whether a vehicle operating condition resulting in an increased carbon monoxide emission at an exhaust pipe 48 (FIG. 3) of the vehicle 10 is present. Whether a vehicle component condition, such as an open window 38 or open sunroof 42, is detected. The operation mode of the HVAC system 14, or the HVAC setting, is switched from the recirculating air mode to the fresh air mode when at least one of the vehicle operating condition and the vehicle component condition is detected as being present.

In accordance with another exemplary embodiment of the present invention, a method of preventing exhaust gas intrusion includes detecting whether a vehicle malfunction indicator light 50 is illuminated. Whether a vehicle component condition, such as an open window 38 or an open sunroof 42, is detected. The operation mode of the HVAC system 14, or the HVAC setting, is switched from the recirculating air mode to the fresh air mode when at least one of the malfunction indicator light 50 being illuminated and the vehicle component condition is detected as being present.

Figure 4:
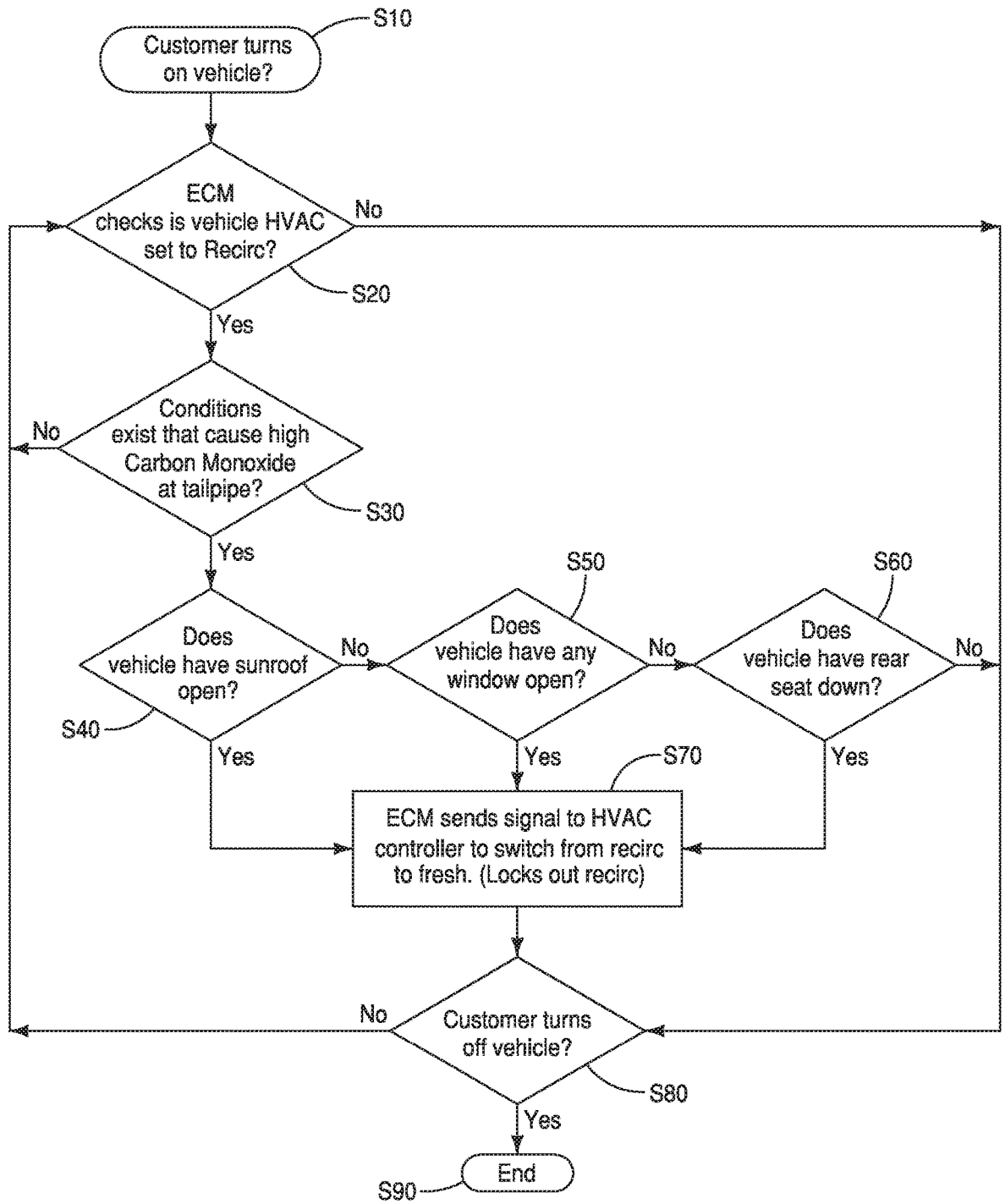
FIG. 4 is a flowchart illustrating an exhaust gas intrusion prevention system in accordance with a first exemplary embodiment of the present invention.

A method of preventing exhaust gas intrusion in the passenger compartment 12 of the vehicle 10 in accordance with a first exemplary embodiment of the present invention is shown in FIG. 4. When the vehicle is turned on (Step S10), the process moves to Step S20.

In Step S20, the electronic control module detects whether the HVAC setting is in the recirculating air mode or the fresh air mode. When the electronic control module detects that the HVAC setting is not in the recirculating air mode (i.e., in the fresh air mode), the process moves to Step S80 in which a determination is made whether the vehicle has been turned off. If the vehicle is turned off, the process ends (Step S90). If the vehicle is still operational (i.e., the engine is running), the process returns to Step S20 and the electronic control module detects whether the HVAC setting is in the recirculating air mode or the fresh air mode.

When the electronic control module detects that the HVAC setting is in the recirculating air mode, the process moves to Step S30 in which whether a vehicle operating condition resulting in an increased carbon monoxide emission at the exhaust pipe 48 (FIG. 3) of the vehicle is present is detected. When the vehicle operating condition resulting in increased carbon monoxide emission at the exhaust pipe is detected to be present, the process moves to Step S40. When the vehicle operating condition resulting in increased carbon monoxide emission at the exhaust pipe 48 is not detected to be present, the process returns to Step S20 to detect the vehicle HVAC setting.

Operations that can result in increased carbon monoxide emission at the exhaust pipe 48 include, but are not limited to, the engine running rich and the pre- and post-catalyst oxygen ($O_2$) sensor not detecting a change. The air/fuel mixture can be detected, and when the ratio falls beneath a predetermined amount, such as a 12:1 air/fuel mixture, the electronic control module 28 detects a condition that can result in increased carbon monoxide emission at the exhaust pipe 48. The electronic control module 48 can also monitor the oxygen levels ($O_2$) before and after passing through a catalyst of the catalytic converter. A first sensor is disposed before the catalyst (pre-catalyst) and a second sensor is disposed after the catalyst (post-catalyst). Detecting the same $O_2$ levels (i.e., no change in $O_2$ levels) with the pre- and post-catalyst sensors is indicative of a problem or failure of the catalyst, thereby resulting in increased carbon monoxide emissions at the exhaust pipe 48. These conditions can be monitored to trigger a detection of vehicle operating condition resulting in increased carbon monoxide emissions at the exhaust pipe 48 of the vehicle 10 in Step S30. These examples are not exhaustive, and other systems that affect the exhaust can be monitored for a condition that results in increased carbon monoxide levels at the exhaust pipe 48.

In Steps S40, S50 and S60, whether a vehicle component condition is present is detected. In Step S40, the detected vehicle component condition is whether the sunroof 42 is open. In Step S50, the detected vehicle component condition is whether a window 38 is open. In Step S60, the detected vehicle component condition is whether a rear seat 44 is moved from the upright position. In Step S40, when the sunroof 42 is detected to be open, the process moves to Step S70. When the sunroof 42 is not detected to be open in Step S40, the process moves to Step S50. In Step S50, when one of the windows 38 is detected to be open, the process moves to Step S70. When one of the windows 38 is not detected to be open in Step S50, the process moves to Step S60. In Step S60, when one of the rear seats 44 is detected to not be in the upright position, the process moves to Step S70. When one of the rear seats 44 is not detected to be moved from the upright position (i.e., the rear seats 44 are detected to be in the upright position) in Step S60, the process moves to Step S80 (i.e., the HVAC setting is not switched from the recirculating air mode to the fresh air mode).

In Step S70, the electronic control module 38 sends a signal to the controller 46 to switch from the recirculating air mode to the fresh air mode. The electronic control module 38 further locks the HVAC setting in the recirculating air mode such that the HVAC setting cannot be returned to the recirculating air mode from the fresh air mode. The HVAC setting is unlocked in Step S90 when a determination is made in Step S80 that the vehicle 10 has been turned of, such that the HVAC setting can be returned to the recirculating air mode upon the next operation of the vehicle 10.

In Steps S40, S50 and S60, the presence of a vehicle component condition is detected. The vehicle component condition being detected, such as the condition of the sunroof 42, window 38, or rear seat 44, is a condition that results in a negative pressure, or vacuum, in the passenger compartment 12 of the vehicle during operation of the vehicle 10. The negative pressure can possibly draw carbon monoxide from the exhaust system into the passenger compartment 12. When the vehicle component condition is detected as being present, in addition to detecting that a vehicle operating condition resulting in the increased carbon monoxide emission at the exhaust pipe 48 is present, the HVAC setting is switched from the recirculating air mode to the fresh air mode.

When the vehicle 10 is detected to not be turned off in Step S80 but the HVAC is locked in the fresh air mode, the process moves to step S90 and ends. The HVAC setting is unlocked when the engine is started again. When the process moves to Step S80 without having locked out the HVAC setting (from Step S20 or Step S60), the process returns to Step S20.

Figure 5:
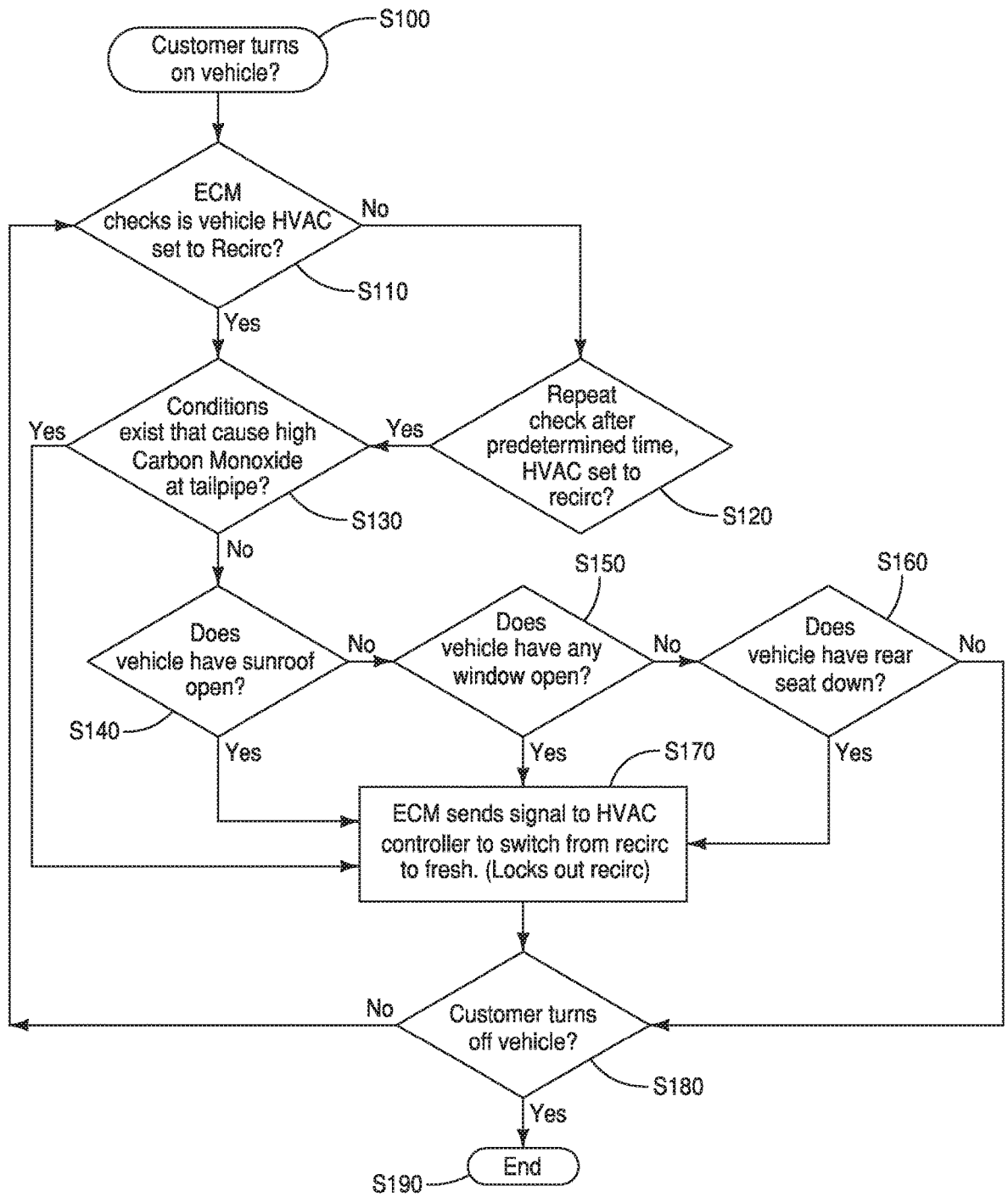
FIG. 5 is a flowchart illustrating an exhaust gas intrusion prevention system in accordance with a second exemplary embodiment of the present invention

A method of preventing exhaust gas intrusion in the passenger compartment 12 of the vehicle 10 in accordance with a second exemplary embodiment of the present invention is shown in FIG. 5. When the vehicle 10 is turned on (Step S100), the process moves to Step S110.

In Step S110, the electronic control module detects whether the HVAC setting is in the recirculating air mode or the fresh air mode. When the electronic control module 28 detects that the HVAC setting is not in the recirculating air mode (i.e., in the fresh air mode), the process moves to Step S120 in which a determination is continuously repeated after a predetermined amount of time whether the HVAC setting has been set to the recirculating air mode. The predetermined amount of time can be thirty seconds, or any other suitable amount of time.

When the electronic control module detects that the HVAC setting is in the recirculating air mode in Step S110 or Step S120, the process moves to Step S130 in which whether a vehicle operating condition resulting in an increased carbon monoxide emission at an exhaust pipe (FIG. 3) of the vehicle 10 is present is detected. When the vehicle operating condition resulting in increased carbon monoxide emission at the exhaust pipe 48 is detected to be present, the process moves to Step S170. When the vehicle operating condition resulting in increased carbon monoxide emission at the exhaust pipe 48 is not detected to be present, the process moves to Step S140 to detect the vehicle component condition.

In Steps S140, S150 and S160, whether a vehicle component condition is present is detected. In Step S140, the detected vehicle component condition is whether the sunroof 42 is open. In Step S150, the detected vehicle component condition is whether a window 38 is open. In Step S160, the detected vehicle component condition is whether the rear seat 44 is moved from the upright position. In Step S140, when the sunroof 42 is detected to be open, the process moves to Step S170. When the sunroof 42 is not detected to be open in Step S140, the process moves to Step S150. In Step S150, when one of the windows 38 is detected to be open, the process moves to Step S170. When one of the windows 38 is not detected to be open in Step S150, the process moves to Step S160. In Step S160, when one of the rear seats 44 is detected to not be in the upright position, the process moves to Step S170. When one of the rear seats 44 is not detected to be moved from the upright position (i.e., the rear seats 44 are detected to be in the upright position) in Step S160, the process moves to Step S180.

In Step S170, the electronic control module 28 sends a signal to the controller 46 to switch from the recirculating air mode to the fresh air mode. The electronic control module 28 further locks the HVAC setting in the recirculating air mode such that the HVAC setting cannot be returned to the recirculating air mode from the fresh air mode. The HVAC setting is unlocked in Step S190 when a determination is made in Step S180 that the vehicle 10 has been turned off.

When the vehicle 10 is detected to not be turned off in Step S180 but the HVAC is locked in the fresh air mode, the process moves to step S190 and ends. The HVAC setting is unlocked when the engine is started again. When the process moves to Step S180 without having locked out the HVAC setting (from Step S160), the process returns to Step S110.

When the vehicle component condition is detected as being present or a vehicle operating condition resulting in the increased carbon monoxide emission at the exhaust pipe 48 is detected as being present, the HVAC setting is switched from the recirculating air mode to the fresh air mode.

Figure 6:
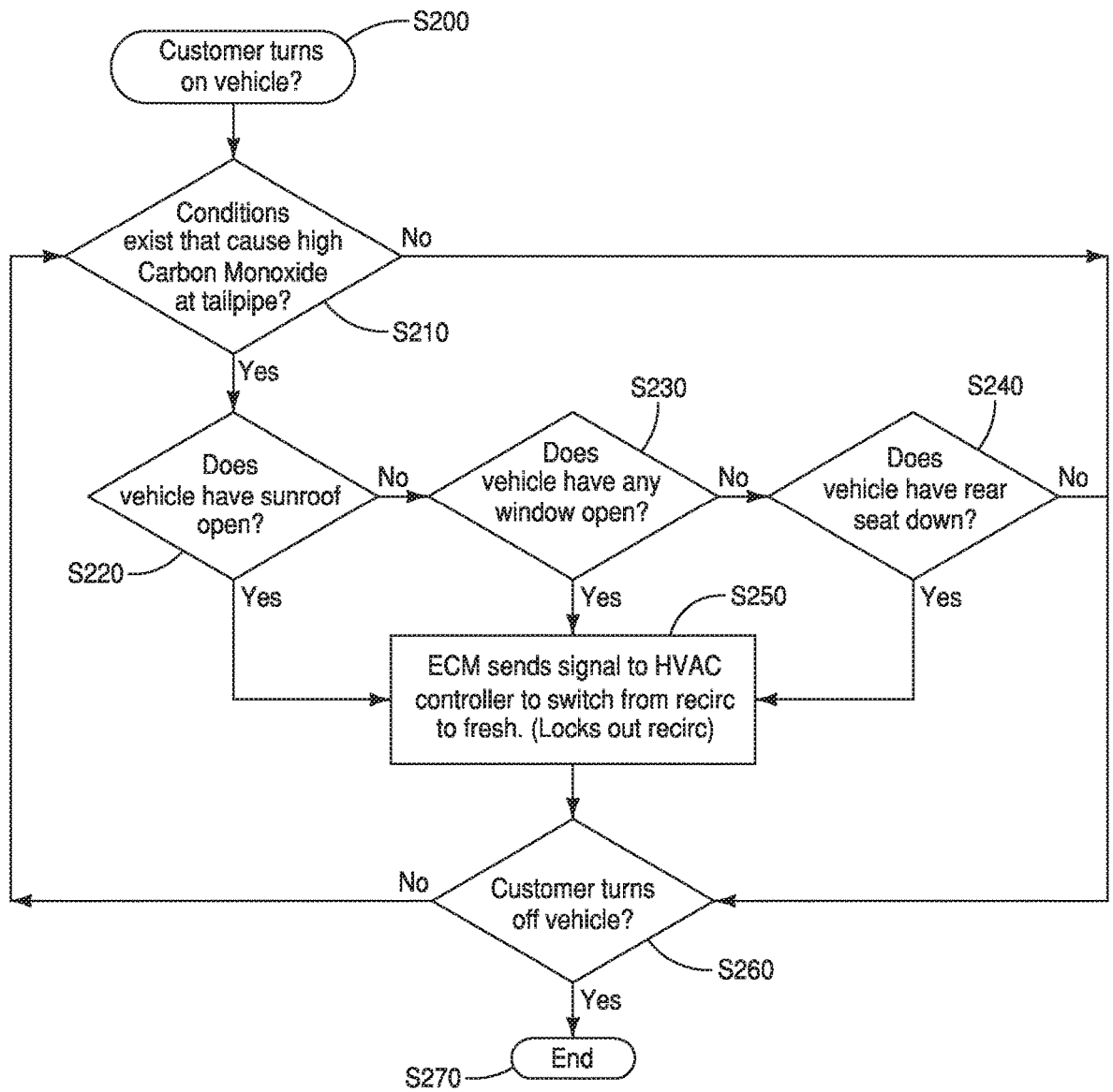
FIG. 6 is a flowchart illustrating an exhaust gas intrusion prevention system in accordance with a third exemplary embodiment of the present invention

A method of preventing exhaust gas intrusion in the passenger compartment 12 of the vehicle 10 in accordance with a third exemplary embodiment of the present invention is shown in FIG. 6. When the vehicle 10 is turned on (Step S200), the process moves to Step S210.

Step S210 detects whether a vehicle operating condition resulting in an increased carbon monoxide emission at an exhaust pipe (FIG. 3) of the vehicle is present. When the vehicle operating condition resulting in increased carbon monoxide emission at the exhaust pipe 48 is detected to be present, the process moves to Step S250. When the vehicle operating condition resulting in increased carbon monoxide emission at the exhaust pipe 48 is not detected to be present, the process returns to Step S220 to detect the vehicle component condition.

In Steps S220, S230 and S240, whether a vehicle component condition is present is detected. In Step S220, the detected vehicle component condition is whether the sunroof 42 is open. In Step S230, the detected vehicle component condition is whether a window 38 is open. In Step S240, the detected vehicle component condition is whether the rear seat 44 is moved from the upright position. In Step S220, when the sunroof 42 is detected to be open, the process moves to Step S250. When the sunroof 42 is not detected to be open in Step S220, the process moves to Step S230. In Step S230, when one of the windows 38 is detected to be open, the process moves to Step S250. When one of the windows 38 is not detected to be open in Step S230, the process moves to Step S240. In Step S240, when one of the rear seats 44 is detected to be in the upright position, the process moves to Step S250. When one of the rear seats 44 is not detected to be moved from the upright position (i.e., the rear seats are detected to be in the upright position) in Step S240, the process moves to Step S260.

In Step S250, the electronic control module 28 sends a signal to the controller 46 to switch from the recirculating air mode to the fresh air mode. The electronic control module 28 further locks the HVAC setting in the recirculating air mode such that the HVAC setting cannot be returned to the recirculating air mode from the fresh air mode. The HVAC setting is unlocked in Step S270 when a determination is made in Step S260 that the vehicle has been turned off.

When the vehicle 10 is detected to not be turned off in Step S260 but the HVAC is locked in the fresh air mode, the process moves to step S270 and ends. The HVAC setting is unlocked when the engine is started again. When the process moves to Step S260 without having locked out the HVAC setting (from Step S210 or Step S240), the process returns to Step S210.

When the vehicle component condition is detected as being present, in addition to detecting that a vehicle operating condition resulting in the increased carbon monoxide emission at the exhaust pipe 48 is present, the HVAC setting is switched from the recirculating air mode to the fresh air mode.

Figure 7:
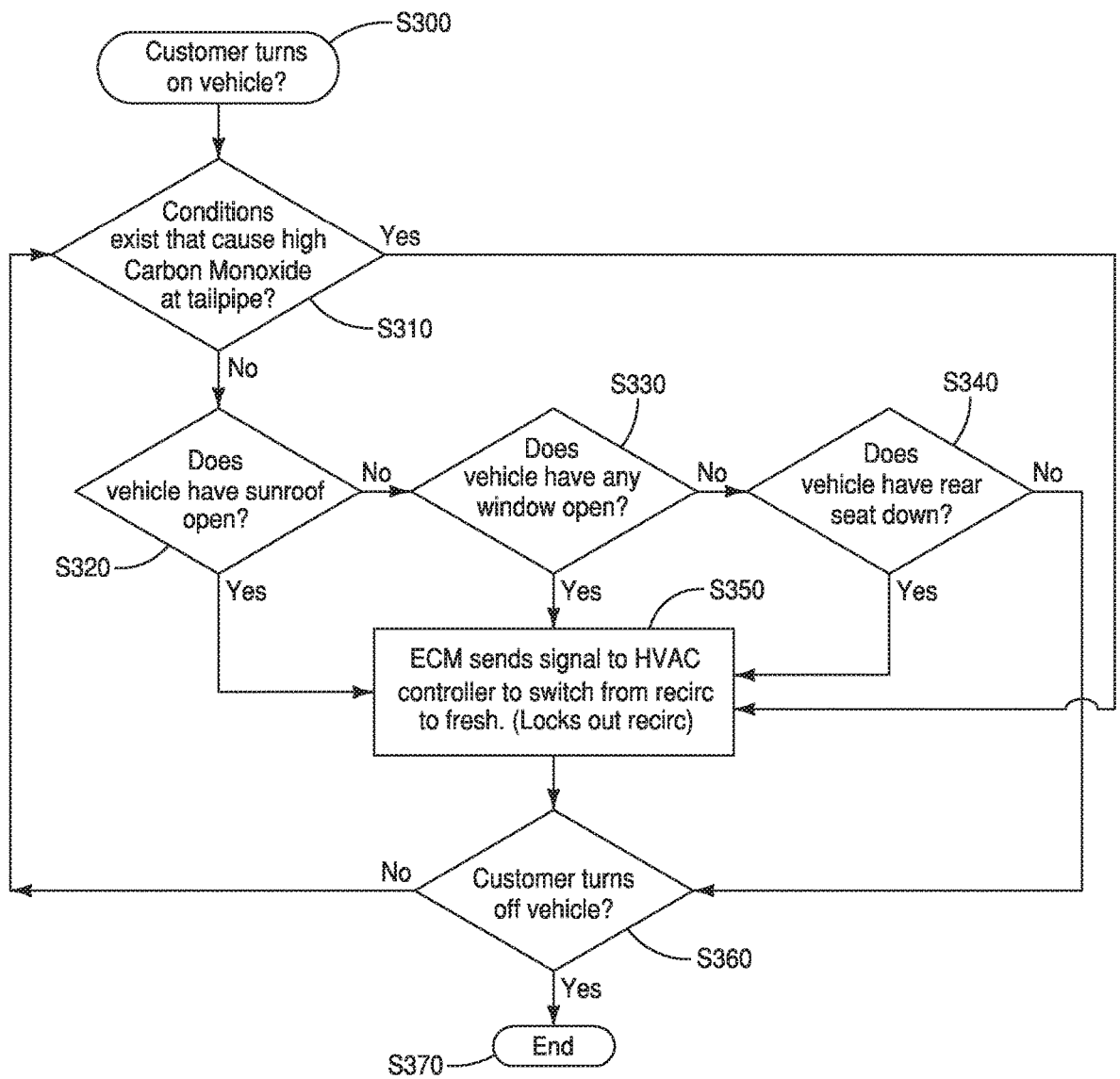
FIG. 7 is a flowchart illustrating an exhaust gas intrusion prevention system in accordance with a fourth exemplary embodiment of the present invention

A method of preventing exhaust gas intrusion in the passenger compartment 12 of the vehicle 10 in accordance with a fourth exemplary embodiment of the present invention is shown in FIG. 7. When the vehicle 10 is turned on (Step S300), the process moves to Step S310.

Step S310 detects whether a vehicle operating condition resulting in an increased carbon monoxide emission at an exhaust pipe (FIG. 3) of the vehicle is present. When the vehicle operating condition resulting in increased carbon monoxide emission at the exhaust pipe 48 is detected to be present, the process moves to Step S350. When the vehicle operating condition resulting in increased carbon monoxide emission at the exhaust pipe 48 is not detected to be present, the process moves to Step S320 to detect the vehicle component condition.

In Steps S320, S330 and S340, whether a vehicle component condition is present is detected. In Step S320, the detected vehicle component condition is whether the sunroof 42 is open. In Step S330, the detected vehicle component condition is whether a window 38 is open. In Step S340, the detected vehicle component condition is whether the rear seat 44 is moved from the upright position. In Step S320, when the sunroof 42 is detected to be open, the process moves to Step S350. When the sunroof 42 is not detected to be open in Step S320, the process moves to Step S330. In Step S330, when one of the windows 38 is detected to be open, the process moves to Step S350. When one of the windows 38 is not detected to be open in Step S330, the process moves to Step S340. In Step S340, when one of the rear seats 44 is detected to not be in the upright position, the process moves to Step S350. When one of the rear seats 44 is not detected to be moved from the upright position (i.e., the rear seats 44 are detected to be in the upright position) in Step S340, the process moves to Step S360.

In Step S350, the electronic control module 28 sends a signal to the controller 46 to switch from the recirculating air mode to the fresh air mode. The electronic control module 28 further locks the HVAC setting in the recirculating air mode such that the HVAC setting cannot be returned to the recirculating air mode from the fresh air mode. The HVAC setting is unlocked in Step S370 when a determination is made in Step S360 that the vehicle 10 has been turned off.

When the vehicle 10 is detected to not be turned off in Step S360 but the HVAC is locked in the fresh air mode, the process moves to step S370 and ends. The HVAC setting is unlocked when the engine is started again. When the process moves to Step S360 without having locked out the HVAC setting (from Step S340), the process returns to Step S310.

When the vehicle component condition is detected as being present or a vehicle operating condition resulting in the increased carbon monoxide emission at the exhaust pipe 48 is detected as being present, the HVAC setting is switched from the recirculating air mode to the fresh air mode.

Figure 8:
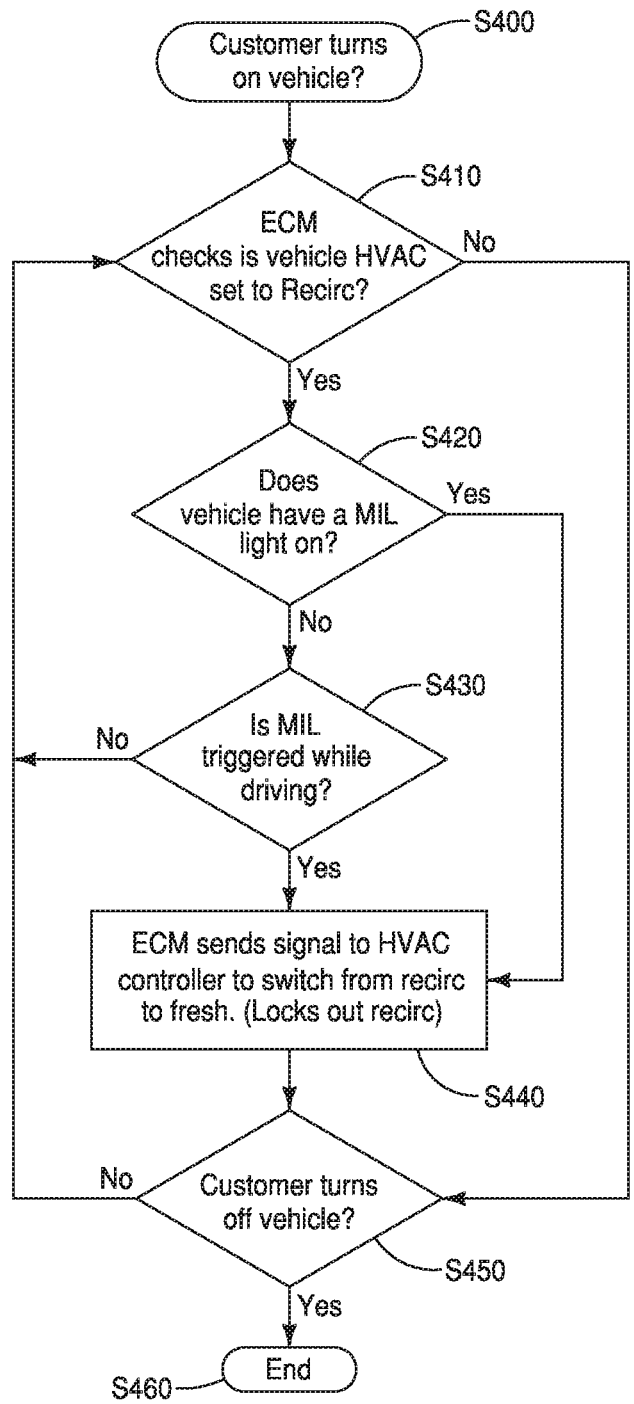
FIG. 8 is a flowchart illustrating an exhaust gas intrusion prevention system in accordance with a fifth exemplary embodiment of the present invention

A method of preventing exhaust gas intrusion in the passenger compartment 12 of the vehicle 10 in accordance with a fifth exemplary embodiment of the present invention is shown in FIG. 8. When the vehicle 10 is turned on in Step S400, the process moves to Step S410.

In Step S410, the electronic control module 28 detects whether the HVAC setting is in the recirculating air mode or the fresh air mode. When the electronic control module 28 detects that the HVAC setting is not in the recirculating air mode (i.e., in the fresh air mode), the process moves to Step S450 in which a determination is made whether the vehicle 10 has been turned off. When the vehicle 10 is turned off, the process ends (Step S460). When the vehicle 10 is being operated (i.e., the engine is running), the process returns to Step S410 and the electronic control module 28 detects whether the HVAC setting is in the recirculating air mode or the fresh air mode.

When the electronic control module 28 detects that the HVAC setting is in the recirculating air mode, the process moves to Step S420 in which whether the malfunction indicator light 50 is illuminated. The malfunction indicator light 50 can be a check engine light or other indicator light that indicates a problem that could lead to increased carbon monoxide emissions at the exhaust pipe 48. When the malfunction indicator light 50 is detected to be illuminated, the process moves to Step S440. When the malfunction indicator light 50 is not detected to be illuminated, the process moves to Step S430. When the malfunction indicator light 50 is detected to be illuminated while driving, the process returns to Step S410.

In Step S440, the electronic control module 28 sends a signal to the controller 46 to switch from the recirculating air mode to the fresh air mode. The electronic control module further locks the HVAC setting in the recirculating air mode such that the HVAC setting cannot be returned to the recirculating air mode from the fresh air mode. The HVAC setting is unlocked in Step S460 when a determination is made in Step S450 that the vehicle has been turned off.

When the vehicle 10 is detected to not be turned off in Step S450 but the HVAC is locked in the fresh air mode, the process moves to step S460 and ends. The HVAC setting is unlocked when the engine is started again. When the process moves to Step S460 without having locked out the HVAC setting (from Step S410), the process returns to Step S410.

When the HVAC setting is in recirculating air mode and the malfunction indicator light is illuminated, the HVAC setting is switched from the recirculating air mode to the fresh air mode.

Figure 9:
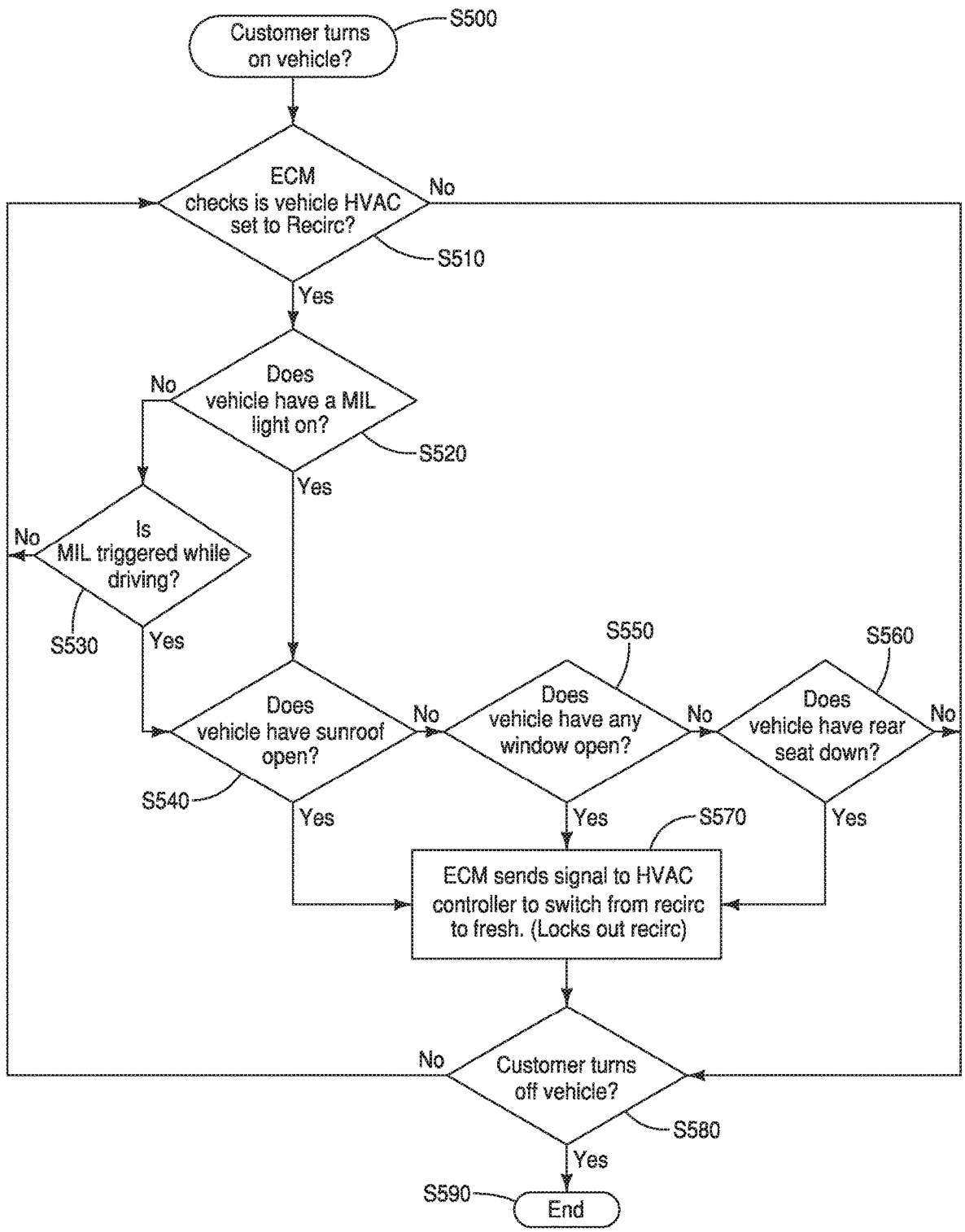
FIG. 9 is a flowchart illustrating an exhaust gas intrusion prevention system in accordance with a sixth exemplary embodiment of the present invention

A method of preventing exhaust gas intrusion in the passenger compartment 12 of the vehicle 10 in accordance with a sixth exemplary embodiment of the present invention is shown in FIG. 9. When the vehicle 10 is turned on in Step S500, the process moves to Step S510.

In Step S510, the electronic control module 28 detects whether the HVAC setting is in the recirculating air mode or the fresh air mode. When the electronic control module 28 detects that the HVAC setting is not in the recirculating air mode (i.e., in the fresh air mode), the process moves to Step S580 in which a determination is made whether the vehicle 10 has been turned off. When the vehicle 10 is turned off, the process ends (Step S590). When the vehicle 10 is still operational (i.e., the engine is running), the process returns to Step S510 and the electronic control module 28 detects whether the HVAC setting is in the recirculating air mode or the fresh air mode.

When the electronic control module 28 detects that the HVAC setting is in the recirculating air mode, the process moves to Step S520 in which whether the malfunction indicator light 50 is illuminated. When the malfunction indicator light 50 is detected to be illuminated, the process moves to Step S540 to detect whether a vehicle component condition is present. When the malfunction indicator light 50 is not detected to be illuminated, the process moves to Step S530. When the malfunction indicator light 50 is detected to be illuminated while driving, the process returns to Step S510 to detect whether the HVAC setting is in the recirculating air mode.

In Steps S540, S550 and S560, whether a vehicle component condition is present is detected. In Step S540, the detected vehicle component condition is whether the sunroof 42 is open. In Step S550, the detected vehicle component condition is whether a window 38 is open. In Step S560, the detected vehicle component condition is whether a rear seat 44 is moved from the upright position. In Step S540, when the sunroof 42 is detected to be open, the process moves to Step S570. When the sunroof 42 is not detected to be open in Step S540, the process moves to Step S550. In Step S550, when one of the windows 38 is detected to be open, the process moves to Step S570. When one of the windows 38 is not detected to be open in Step S550, the process moves to Step S560. In Step S560, when one of the rear seats 44 is detected to not be in the upright position, the process moves to Step S570. When one of the rear seats 44 is not detected to be moved from the upright position (i.e., the rear seats 44 are detected to be in the upright position) in Step S560, the process moves to Step S580.

In Step S570, the electronic control module 28 sends a signal to the controller 46 to switch from the recirculating air mode to the fresh air mode. The electronic control module 28 further locks the HVAC setting in the recirculating air mode such that the HVAC setting cannot be returned to the recirculating air mode from the fresh air mode. The HVAC setting is unlocked in Step S590 when a determination is made in Step S580 that the vehicle 10 has been turned off.

When the vehicle 10 is detected to not be turned off in Step S580 but the HVAC is locked in the fresh air mode, the process moves to step S590 and ends. The HVAC setting is unlocked when the engine is started again. When the process moves to Step S580 without having locked out the HVAC setting (from Step S510 or Step S560), the process returns to Step S510.

When the vehicle component condition is detected as being present in addition to the malfunction indicator light being illuminated, the HVAC setting is switched from the recirculating air mode to the fresh air mode.

Figure 10:
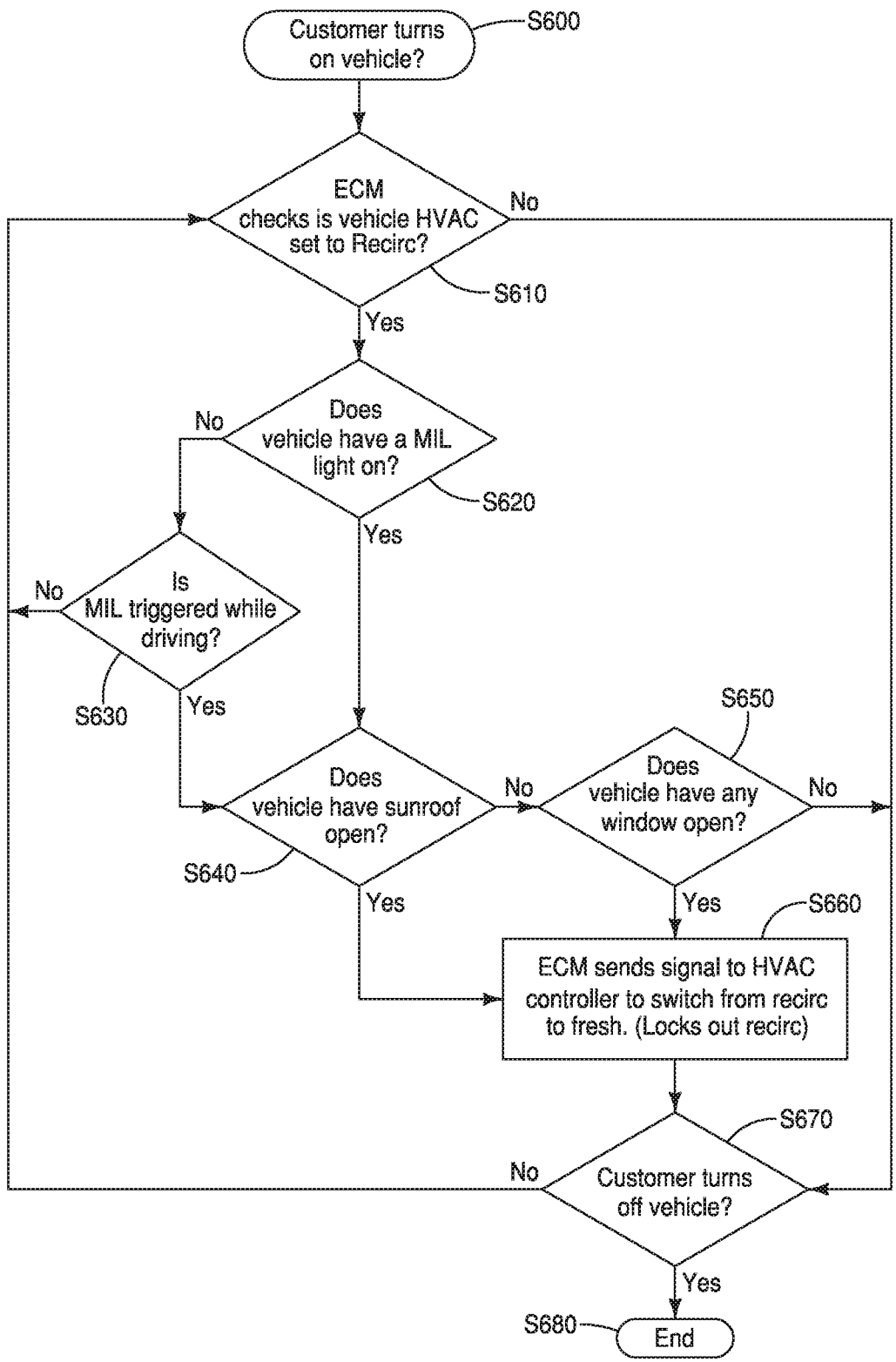
FIG. 10 is a flowchart illustrating an exhaust gas intrusion prevention system in accordance with a seventh exemplary embodiment of the present invention.

A method of preventing exhaust gas intrusion in the passenger compartment 12 of the vehicle 10 in accordance with a seventh exemplary embodiment of the present invention is shown in FIG. 10. The method begins after the vehicle 10 is turned on in Step S600.

In Step S610, the electronic control module 28 detects whether the HVAC setting is in the recirculating air mode or the fresh air mode. When the electronic control module 28 detects that the HVAC setting is not in the recirculating air mode (i.e., in the fresh air mode), the process moves to Step S670 in which a determination is made whether the vehicle has been turned off. When the vehicle 10 is turned off, the process ends (Step S680). When the vehicle is still being operated (i.e., the engine is running), the process returns to Step S610 and the electronic control module 28 detects whether the HVAC setting is in the recirculating air mode or the fresh air mode.

When the electronic control module 28 detects that the HVAC setting is in the recirculating air mode, the process moves to Step S620 in which whether the malfunction indicator light 50 is illuminated. When the malfunction indicator light 50 is detected to be illuminated, the process moves to Step S640 to detect whether a vehicle component condition is present. When the malfunction indicator light 50 is not detected to be illuminated, the process moves to Step S630. When the malfunction indicator light 50 is detected to be illuminated while driving, the process returns to Step S610 to detect whether the HVAC setting is in the recirculating air mode.

In Steps S640 and S650, whether a vehicle component condition is present is detected. In Step S640, the detected vehicle component condition is whether the sunroof 42 is open. In Step S650, the detected vehicle component condition is whether a window 38 is open. In Step S640, when the sunroof 42 is detected to be open, the process moves to Step S660. When the sunroof 42 is not detected to be open in Step S640, the process moves to Step S650. In Step S650, when one of the windows 38 is detected to be open, the process moves to Step S660. When one of the windows 38 is not detected to be open in Step S650, the process moves to Step S670.

In Step S660, the electronic control module 28 sends a signal to the controller 46 to switch from the recirculating air mode to the fresh air mode. The electronic control module 28 further locks the HVAC setting in the recirculating air mode such that the HVAC setting cannot be returned to the recirculating air mode from the fresh air mode. The HVAC setting is unlocked in Step S680 when a determination is made in Step S670 that the vehicle 10 has been turned off.

When the vehicle 10 is detected to not be turned off in Step S670 but the HVAC is locked in the fresh air mode, the process moves to step S680 and ends. The HVAC setting is unlocked when the engine is started again. When the process moves to Step S670 without having locked out the HVAC setting (from Step S610 or Step S650), the process returns to Step S610.

When the vehicle component condition is detected as being present in addition to the malfunction indicator light 50 being illuminated, the HVAC setting is switched from the recirculating air mode to the fresh air mode.

Figure 11:
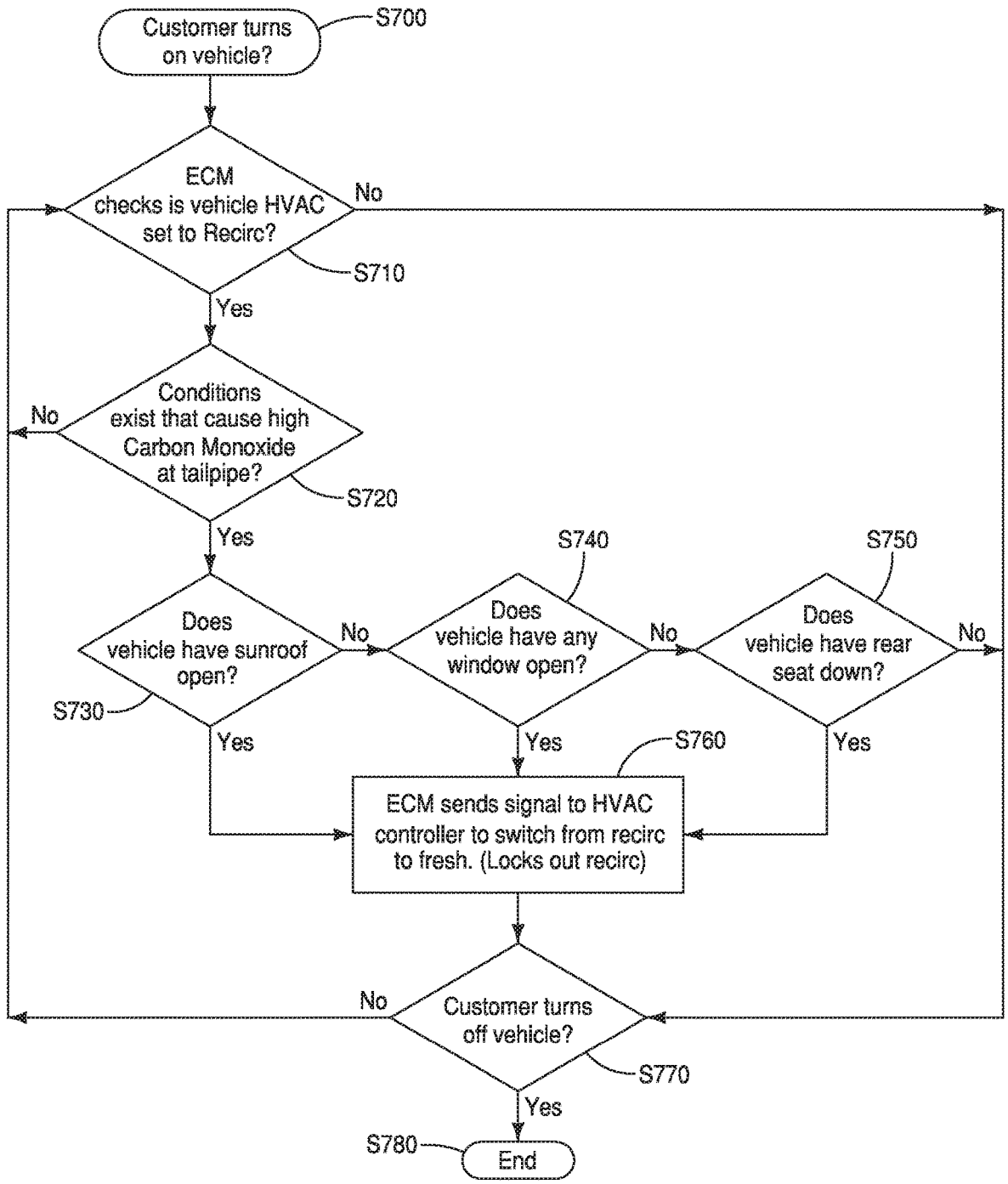
FIG. 11 is a flowchart illustrating an exhaust gas intrusion prevention system in accordance with an eighth exemplary embodiment of the present invention.

A method of preventing exhaust gas intrusion in the passenger compartment 12 of the vehicle 10 in accordance with an eighth exemplary embodiment of the present invention is shown in FIG. 11. When the vehicle 10 is turned on in Step S700, the process moves to Step S710.

In Step S710, the electronic control module 28 detects whether the HVAC setting is in the recirculating air mode or the fresh air mode. When the electronic control module 28 detects that the HVAC setting is not in the recirculating air mode (i.e., in the fresh air mode), the process moves to Step S770 in which a determination is made whether the vehicle 10 has been turned off. When the vehicle 10 is turned off, the process ends (Step S780). When the vehicle 10 is still being operated (i.e., the engine is running), the process returns to Step S710 and the electronic control module 28 detects whether the HVAC setting is in the recirculating air mode or the fresh air mode.

When the electronic control module 28 detects that the HVAC setting is in the recirculating air mode, the process moves to Step S720 in which whether a vehicle operating condition resulting in an increased carbon monoxide emission at an exhaust pipe 48 (FIG. 3) of the vehicle is present is detected. When the vehicle operating condition resulting in increased carbon monoxide emission at the exhaust pipe 48 is detected to be present, the process moves to Step S730 to detect the vehicle component condition. When the vehicle operating condition resulting in increased carbon monoxide emission at the exhaust pipe 48 is not detected to be present, the process returns to Step S710 to detect the vehicle HVAC setting.

In Steps S730, S740 and S750, whether a vehicle component condition is present is detected. In Step S730, the detected vehicle component condition is whether the sunroof 42 is open. In Step S740, the detected vehicle component condition is whether a 38 window is open. In Step S750, the detected vehicle component condition is whether the rear seat 44 is moved from the upright position. In Step S730, when the sunroof 42 is detected to be open, the process moves to Step S760. When the sunroof 42 is not detected to be open in Step S730, the process moves to Step S740. In Step S740, when one of the windows 38 is detected to be open, the process moves to Step S760. When one of the windows 38 is not detected to be open in Step S740, the process moves to Step S750. In Step S750, when one of the rear seats 44 is detected to not be in the upright position, the process moves to Step S760. When one of the rear seats 44 is not detected to be moved from the upright position (i.e., the rear seats 44 are detected to be in the upright position) in Step S750, the process moves to Step S770.

In Step S760, the electronic control module 28 sends a signal to the controller 46 to switch from the recirculating air mode to the fresh air mode. The electronic control module 28 further locks the HVAC setting in the recirculating air mode such that the HVAC setting cannot be returned to the recirculating air mode from the fresh air mode. The HVAC setting is unlocked in Step S780 when a determination is made in Step S770 that the vehicle 10 has been turned off.

When the vehicle 10 is detected to not be turned off in Step S770 but the HVAC is locked in the fresh air mode, the process moves to step S780 and ends. The HVAC setting is unlocked when the engine is started again. When the process moves to Step S770 without having locked out the HVAC setting (from Step S710 or Step S750), the process returns to Step S710.

When the vehicle component condition is detected as being present, in addition to detecting that a vehicle operating condition resulting in the increased carbon monoxide emission at the exhaust pipe 48 is present, the HVAC setting is switched from the recirculating air mode to the fresh air mode.

In another exemplary embodiment, after the HVAC setting is locked, the process can repeat to determine whether any of the conditions have cleared, thereby unlocking the HVAC setting. For example, when the sunroof or a window is closed after locking the HVAC setting in the fresh air mode, the process can repeat and unlock the HVAC setting (such that the HVAC setting can be operated in recirculating air mode) when a condition is determined to have changed.

The controller preferably includes a microcomputer with an HVAC operating mode control program that controls the HVAC mode setting assembly. The controller can also include other conventional components, such as an input interface circuit, an output interface circuit, and storage devices, such as a ROM (Read Only Memory) device and a RAM (Random Access Memory) device. The microcomputer of the controller is programmed to control the HVAC mode setting assembly. The memory circuit stores processing results and control programs, such as ones for HVAC system operational modes that are run by the processor circuit. The controller is operatively coupled to the electronic control module and the HVAC system in a conventional manner. The internal RAM of the controller stores statuses of operational flags and various control data. The controller is capable of selectively controlling any of the components of the HVAC mode setting assembly in accordance with the control program. It will be apparent to those skilled in the art from this disclosure that the precise structure and algorithms for the controller can be any combination of hardware and software that will carry out the functions of the present invention.

The vehicle 10 includes various mechanisms and elements that are conventional components well known in the art. Since vehicle elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with a method or apparatus of eliminating exhaust gas intrusion in a passenger compartment of a vehicle. Accordingly, these terms, as utilized to describe the present invention should be interpreted relative to a vehicle equipped with a method or apparatus of eliminating exhaust gas intrusion in a passenger compartment of a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of preventing exhaust gas intrusion in a passenger compartment of a vehicle, comprising:
   detecting whether a vehicle operating condition indicative of an increased carbon monoxide emission at an exhaust pipe is present during operation of the vehicle, the vehicle operating condition being an air/fuel mixture ratio being less than a predetermined amount or an oxygen level before and after a catalyst of a catalytic converter being the same;
   detecting whether a vehicle component condition is present, the vehicle component condition being an open window, an open sunroof, or a rear seat being moved from an upright position;
   switching an HVAC setting from a recirculating air mode to a fresh air mode when at least one of the vehicle operating condition and the vehicle component condition is detected as being present; and
   preventing the HVAC setting from being switched back to the recirculating air mode from the fresh air mode after switching to the fresh air mode responsive to at least one of the vehicle operating condition and the vehicle component condition being detected until after a vehicle engine is stopped.

2. The method according to claim 1, further comprising detecting whether the HVAC setting is in the recirculating air mode or the fresh air mode, and
   detecting the vehicle operating condition and the vehicle component condition when the detected HVAC setting is in the recirculating air mode.

* * * * *